(12) United States Patent
Kagawa (10) Patent No.: US 6,505,376 B1
(45) Date of Patent: Jan. 14, 2003

(54) WIPER APPARATUS FOR VEHICLE

(75) Inventor: Mamoru Kagawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 401 days.

(21) Appl. No.: 09/121,433

(22) Filed: Jul. 23, 1998

(30) Foreign Application Priority Data

Jul. 24, 1997 (JP) .............................. 9-198093

(51) Int. Cl.⁷ ................................................. B60S 1/06
(52) U.S. Cl. ................ 15/250.31; 15/250.3; 296/96.15; 296/96.17; 403/2; 403/DIG. 3
(58) Field of Search ................... 15/250.31, 250.3, 15/250.34, 250.003, 250.27; 384/415, 624, 296, 903; 403/2, DIG. 3; 296/96.17, 96.15

(56) References Cited

U.S. PATENT DOCUMENTS 5,203,049 A * 4/1993 Nogawa ................... 15/250.34
5,337,439 A * 8/1994 Frey et al. ................ 15/250.31
5,774,928 A * 7/1998 Schitter et al. ........... 15/250.31

FOREIGN PATENT DOCUMENTS

| FR | 1295601 | * 5/1962 | .............. 15/250.31 |
| JP | 18750 | * 1/1989 | .............. 15/250.31 |

* cited by examiner

Primary Examiner—Gary K. Graham
(74) Attorney, Agent, or Firm—Carrier, Blackman & Associates, P.C.; Joseph P. Carrier; William D. Blackman

(57) ABSTRACT

A wiper apparatus for a vehicle capable of absorbing impact applied from outside. The wiper apparatus has a rocking wiper arm and a wiper blade attached to a tip end of the wiper arm for wiping a windshield, a pivot fixed to a base end of the wiper arm, and a pivot holder attached to a car-body panel, pivotally supporting the pivot and movable toward inside of a car-body by a load applied from outside of the vehicle substantially in an axial direction of the pivot. Alternatively, a load absorbing member may be provided outside of a section of the wiper arm where the pivot is fixed.

17 Claims, 9 Drawing Sheets

WIPER APPARATUS FOR VEHICLE

BACKGROUND OF THE INVENTION

1. Field of the Invention

The present invention relates to a wiper apparatus for wiping foreign substances adhering to a surface of a vehicular windshield such as rain water, snow, mud, dust or the like.

2. Discussion of Relevant Art

In general, a wiper apparatus comprises a pivot holder to be attached to a vehicular body panel, a pivot pivotally supported by the pivot holder, a wiper arm having a base end fixed to an end of the pivot projected outward and a wiper blade fixed to a rocking tip end of the wiper arm for wiping a surface of a windshield.

The wiper blade and the wiper arm are positioned outside of the windshield and an end of the pivot to be fixed to the wiper arm projects from a surface of a car-body outward.

Therefore, the wiper arm and the end of the pivot are subject to an external impact load. If the impact load is applied directly, damage such as breaking may be caused.

SUMMARY OF THE INVENTION

The present invention has been accomplished in view of the foregoing and one object of the invention is to provide a wiper apparatus capable of absorbing external impact.

In order to attain the above object, the present invention provides a wiper apparatus for a vehicle having a rocking wiper arm and a wiper blade attached to a tip end of the wiper arm for wiping a windshield, comprising a pivot fixed to a base end of the wiper arm; and a pivot holder attached to a car-body panel, pivotally supporting the pivot and movable toward inside of a car-body by a load applied from outside of the vehicle substantially in an axial direction of the pivot.

The pivot holder supporting the pivot is moved toward the inside of the car-body by a load applied from outside of the vehicle so that an impact load can be absorbed to minimize damage.

The pivot holder may be attached to the car-body panel through a section having low break strength.

When a load is applied from outside of the vehicle in the axial direction of the pivot, the section of low break strength is broken and the pivot holder is dropped out, or moved toward the inside of the car body, absorb a corresponding impact load.

The pivot holder may have a cylindrical bearing section and a flange formed on the cylindrical bearing section to be fixed to the car-body panel, and the section having low break strength may be constituted by a thin portion of the flange formed around the cylindrical bearing section.

When a load is applied from outside of the vehicle in the axial direction, the thin portion of the flange is broken to absorb an impact load.

The pivot holder may have a cylindrical bearing section and a cylindrical male screw portion projecting from the cylindrical bearing section through a section of low break strength, and may be tightened to the car-body panel by a nut engaging with the male screw portion.

When a load is applied from outside of the vehicle in the axial direction, the section of low break strength of the cylindrical male screw portion is broken and the pivot holder is dropped out to absorb a corresponding impact load.

A part of the car-body panel where the pivot holder is attached may be made so as to deform by the load in the axial direction.

When a load is applied from outside of the vehicle in the axial direction, the part of the car-body panel where the pivot is attached is loaded and deformed so that the pivot holder moves toward the inside of the car-body to absorb an impact load.

The wiper apparatus may have an attachment member for attaching the pivot holder to the car-body panel, which can be deformed or dropped out by the load in the axial direction.

When a load is applied from outside of the vehicle in the axial direction, the attachment member is deformed or dropped out so that the pivot holder moves toward inside of the car-body to absorb an impact load.

According to another aspect of the present invention, there is provided a wiper apparatus for a vehicle having a rocking wiper arm and a wiper blade attached to a tip end of the wiper arm for wiping a windshield, comprising a pivot fixed to a base end of the wiper arm; a pivot holder attached to a car-body panel and pivotally supporting the pivot; and a load absorbing member provided outside of a section of the wiper arm where the pivot is fixed apart in an axial direction of the pivot.

When a load is applied from outside of the vehicle in the axial direction, the load absorbing member absorbs a corresponding impact load to minimize damage.

The load absorbing member may be a cover member covering an end of the pivot with an inner space interposed between the cover member and the pivot, having an inside rib adapted to be bent by a load applied in the axial direction of the pivot.

When a load is applied from outside of the vehicle in the axial direction, the cover member is loaded and displaced bending the rib to absorb a corresponding impact load.

The load absorbing member may be a cover member covering an end of the pivot with an inner space interposed between the cover member and the pivot, having a resilient member fitted inside.

When a load is applied from outside of the vehicle in the axial direction, the cover member covering an end of the pivot through the resilient member is loaded and displaced deforming elastically the resilient member to absorb a corresponding impact load.

DETAILED DESCRIPTION OF THE PREFERRED EMBODIMENTS

Hereinafter, a first preferred embodiment of the present invention will be described with reference to FIGS. 1 to 4.

Figure 1:
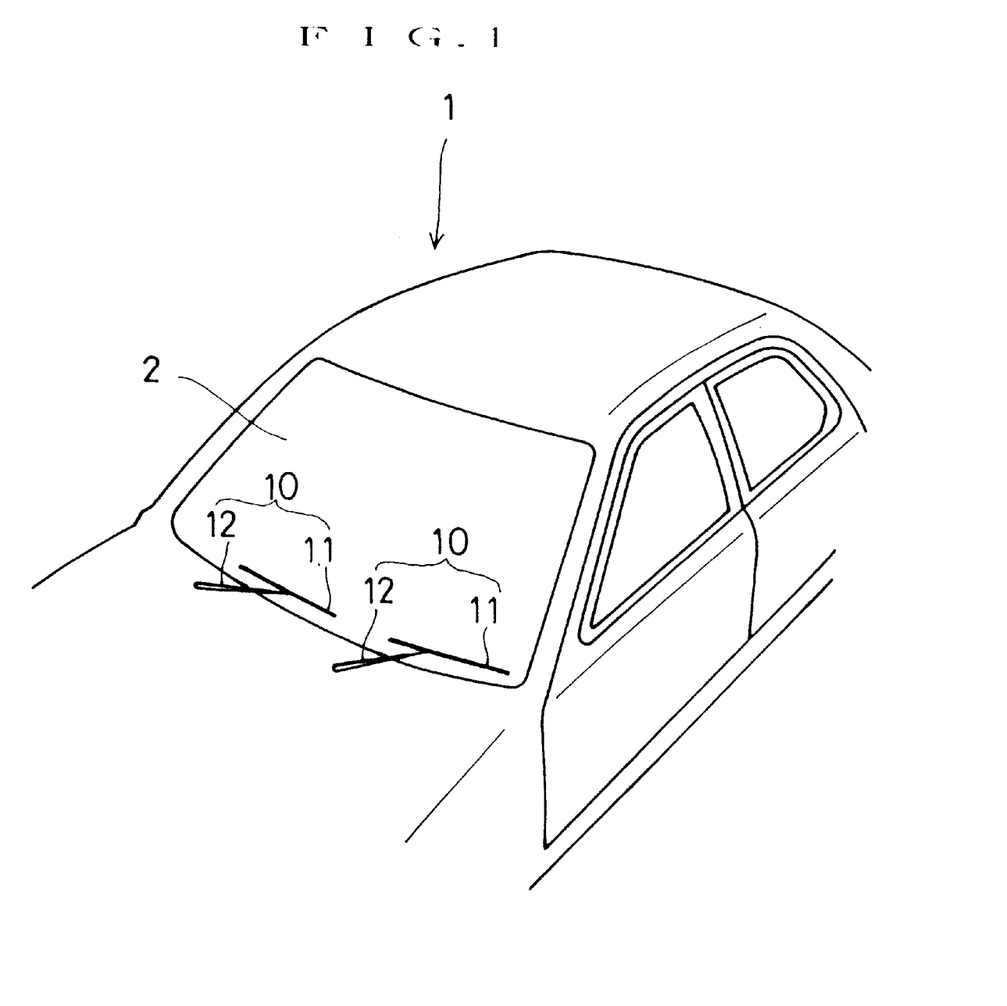
FIG. 1 is an outside perspective view of a front windshield portion of a motorcar having a wiper apparatus according to a first preferred embodiment of the present invention.

FIG. 1 is an outside perspective view of a portion adjacent to a front windshield 2 of a motorcar 1 having a wiper apparatus 10 according to the preferred embodiment.

A pair of right and left wiper apparatuses 10 are provided on the front windshield 2 in front of a driver's seat and a passenger's seat, respectively. In each of the wiper apparatus 10, a wiper blade 11 coming into sliding contact with a surface of the front windshield 2 is rocked right and left by a wiper arm 12 to wipe rain water and other foreign substances for ensuring a good visibility.

The wiper apparatus 10 constitute a tandem type wiper system in which the right and left wiper arms 12 have respective rocking centers at predetermined positions of a lower edge of the front windshield 2 and rock in the same direction in the same time.

Figure 2:
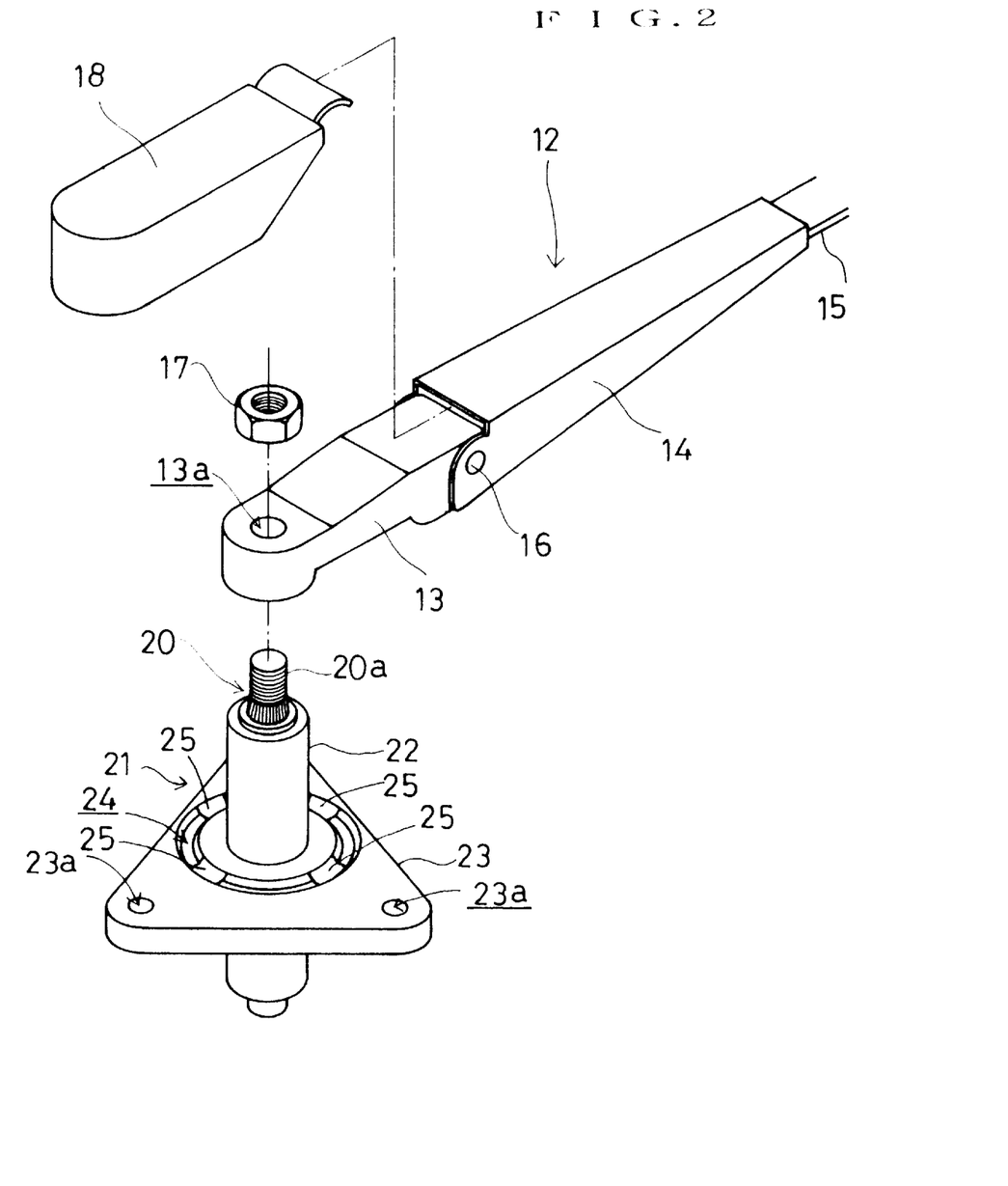
FIG. 2 is an exploded perspective view of an essential part of the wiper apparatus.

As shown in FIG. 2, the wiper arm 12 is composed of an arm head 13, a retainer 14 connected to an end of the arm head 13 by a pin 16 so as to rock, and an arm piece 15 connected to the retainer. The above-mentioned wiper blade 11 is attached to the arm piece 15.

A pivot hole 13a is formed at a base end portion of the arm head 13. An opening of the pivot hole 13a on the inner side is formed in a tapering surface with serration indented. On the one hand, a pivot 20 penetrating the pivot hole 13a has a male screw formed on a tip end 20a and a tapering surface with serration formed at a bottom part of the male screw.

The base end portion of the wiper arm 12 is integrally fixed to the pivot 20 in such a manner that the tip end of the pivot 20 is let pass through the pivot hole 13a of the arm head 13, the serration on the tapering surfaces are fit to each other and a nut 17 is screwed on the male screw tightly. An arm cover 18 is put on the arm head 13 to cover the nut 17 engaged with the male screw.

The pivot 20 is pivotally supported by a pivot holder 21 which has a cylindrical bearing section 22 pivotally supporting the pivot 20 and a triangular flange 23 extending around the bearing section 22 formed integrally there with. Bolt holes 23a are provided at three corners of the triangular flange 23.

The flange 23 has an annular groove 24 formed around the cylindrical bearing section 22 and the annular groove 24 has four thin portions 25 of thin wall thickness.

Figure 3:
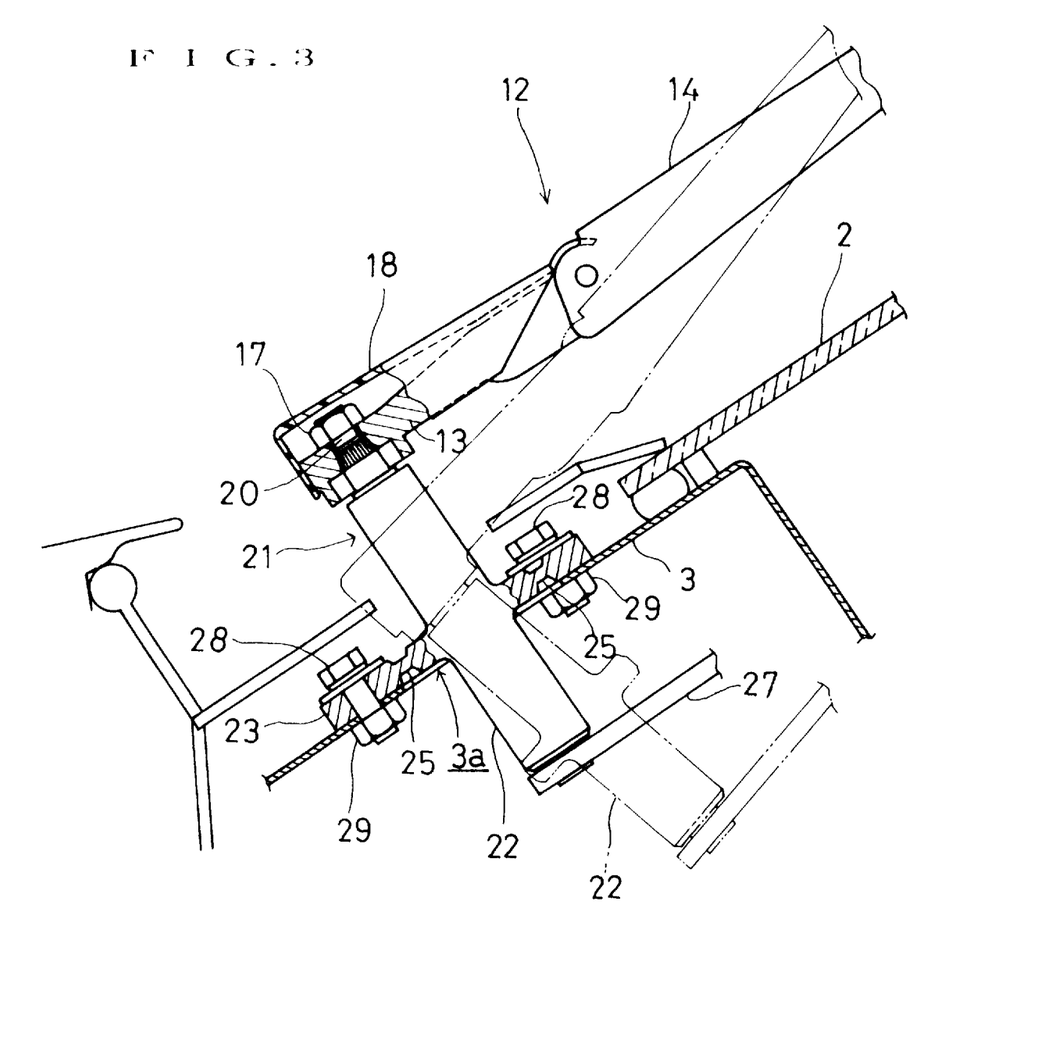
FIG. 3 is a sectional side view showing an attachment construction of the wiper apparatus.
Figure 4:
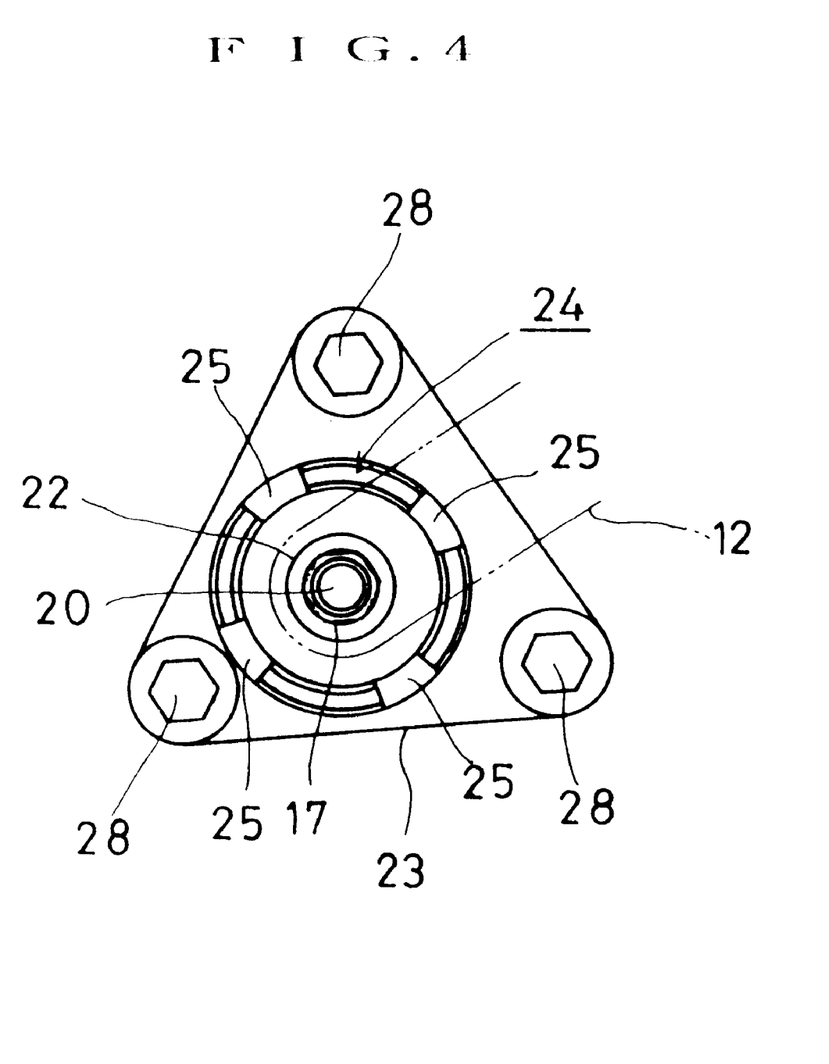
FIG. 4 is a plan view of the same partly omitted.

The pivot holder 21 having such a construction is attached to a car-body panel 3 connected with a lower end edge of the front windshield 2, as shown in FIG. 3.

Namely, the cylindrical bearing section 22 of the pivot holder 21 is inserted in a circular opening 3a of the car-body panel 3 from above, the flange 23 is brought into contact with a peripheral edge portion of the circular opening 3a, bolts 28 are inserted in the bolt holes 23a and corresponding holes of the car-body panel 3 and nuts 29 are engaged with the bolts 28 tightly.

On an end of the pivot 20 projecting downward from the cylindrical bearing section 22 is fitted a link member 27 for rotating the pivot 20.

In the wiper apparatus 10 attached to the car-body panel 3 as mentioned above, when the pivot 20 pivotally supported by the pivot holder 21 is rotated by the link member 27, the wiper arm 12 is rocks together with the pivot 20 about the axis of the pivot 20 and the wiper blade 11 attached to the tip end of the wiper arm 12 slides on the surface of the front windshield 2 to wipe rain water and the like.

Assuming that an impact load is applied on the base end portion of the wiper arm 12 from outside of the vehicle, the load is transmitted to the pivot 20 and the cylindrical bearing section 22 of the pivot holder 21 through the arm cover 18.

In that case, stress concentrates on the annular groove 24 of the flange 23 positioned between the cylindrical bearing section 22 and portions of the flange 23 fixed to the car-body panel 3 by bolts 28, breaking of the flange 23 starts at the thin portions 25 having a low break strength and progresses along the annular groove 24, and finally the cylindrical bearing section 22 is dropped out toward inside of the car-body panel 3 (ref. two-dots-dash line in FIG. 3).

Thus, the impact load is absorbed to minimize damage. Since only the flange 23 of the pivot holder 21 is broken, the repair can be carried out simply by exchanging the pivot holder. The wiper arm 12 and the wiper blade 11 can be reused.

The annular groove 24 of the flange 23 may be provided with long holes in place of the thin portions 25.

Figure 5:
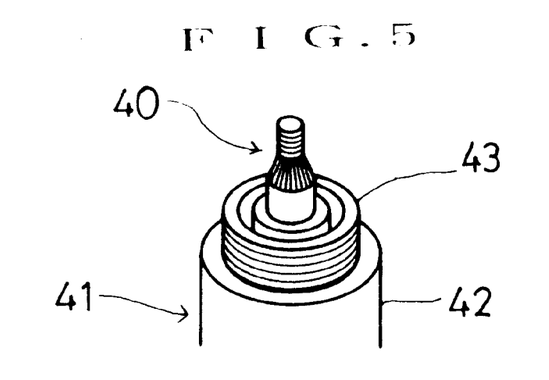
FIG. 5 is a perspective view of an essential part of a pivot and a pivot holder according to a second preferred embodiment of the invention.

Next, a second preferred embodiment will be described with reference to FIGS. 5 and 6. A pivot holder 41 pivotally supporting a pivot 40 is composed of a cylindrical bearing section 42 and a cylindrical male screw section 43 projecting from an end face of the bearing section 42. The cylindrical male screw section 43 projects coaxially with the pivot 40 and. has a gap surrounding a bottom of a projecting end portion of the pivot 40 and a male screw formed on the outer peripheral surface.

Figure 6:
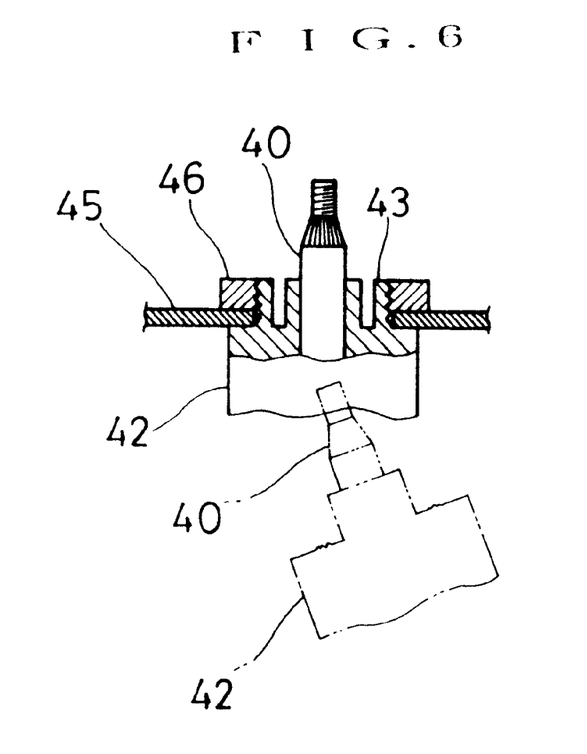
FIG. 6 is a sectional side view showing an attachment construction thereof.

As shown in FIG. 6, a circular opening having a diameter substantially equal to an outer diameter of the cylindrical male screw section 43 is provided at a predetermined position of a car-body panel 45. The cylindrical male screw section 43 of the pivot holder 41 is let pass through the circular opening from inside and a nut 46 is engaged with the male screw portion exposed outside to pinch the car-body panel 45 between an end surface of the cylindrical bearing section 42 and the nut 46 for attachment of the wiper apparatus.

When an impact load is applied to the pivot 40 substantially in the axial direction from outside of the vehicle, the cylindrical bearing section 42 of the pivot holder 41 is loaded, stress concentrates on a root portion of the cylindrical male screw section 43 engaged with the car-body panel 45 by the nut 46 to break the root portion and the pivot holder 41 drops out leaving the cylindrical male screw section 43 behind. Thus, the impact load is absorbed.

Figure 7:
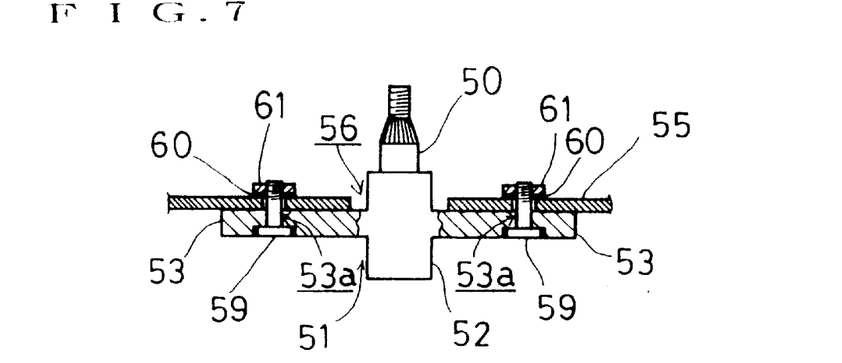
FIG. 7 is a sectional side view showing an essential part of a pivot holder attachment construction according to a third preferred embodiment of the invention.
Figure 8:
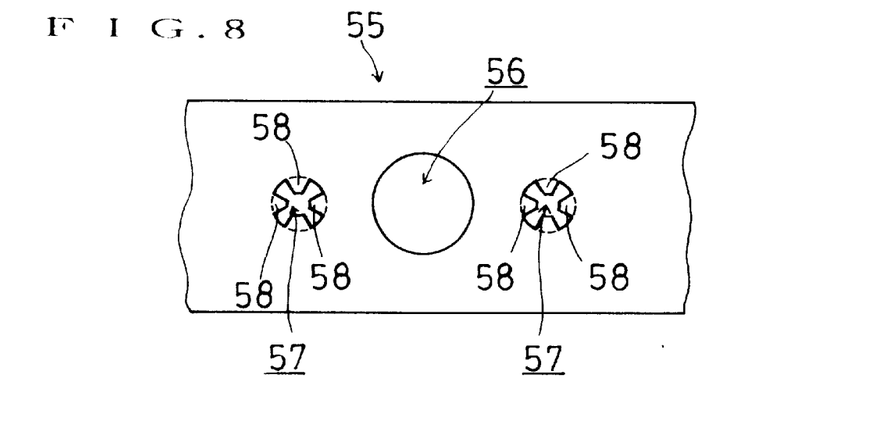
FIG. 8 is a plan view of a car-body panel portion thereof.
Figure 9:
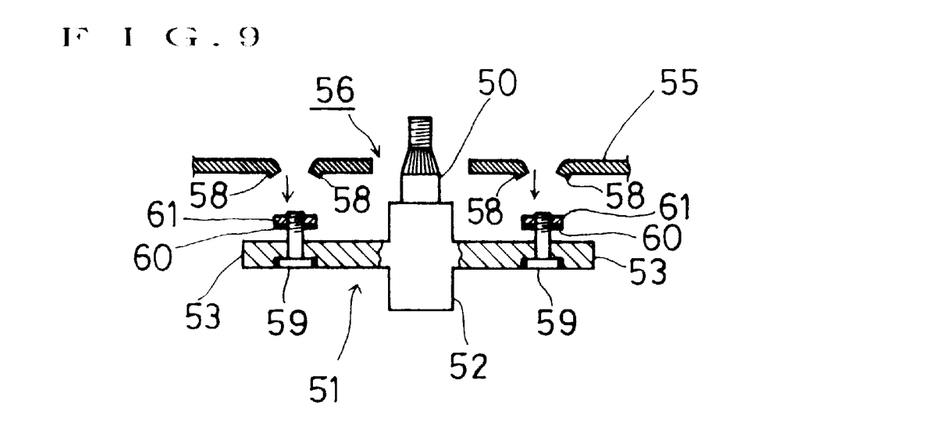
FIG. 9 is a sectional view of an essential part showing a pivot holder after it has dropped out due to an impact load.

FIGS. 7 to 9 show a third embodiment of the present invention. A pivot holder 51 pivotally supporting a pivot 50 is composed of a cylindrical bearing section 52 and a flange 53 extruding from the bearing section 52 right and left. Bolt holes 53a are formed in the both end portions of the flange 53.

On the one hand, a car-body panel 55 is provided with a circular opening 56 and bolt holes 57 formed on the both side thereof. The bolt hole 57 has four retaining pieces 58 projecting inside from the circular edge (FIG. 8).

The pivot holder 51 is attached to the car-body panel 55 from inside. Namely, the cylindrical bearing section 52 is inserted in the circular opening 56 of the car-body panel 55, the flange 53 is brought into contact with the inner surface of the car-body panel 55, bolt 59 are is let pass through bolt holes 53a, 57 aligned with each other from inside and a nut 61 is engaged tightly with the bolt exposed outside with a washer 60 interposed between the nut 61 and the panel 55 (FIG. 7).

The washer 60 is placed on the retaining pieces 58 projecting inside of the bolt hole 53a. Therefore, when an impact load is applied to the pivot 50 substantially in the axial direction from outside of the vehicle, the load is transmitted to the cylindrical bearing section 52 of the pivot holder 51 and then to the retaining piece 58 through the bolt 59, the nut 61 and the washer 60, so that the retaining pieces 58 are deformed and the pivot holder 51 drops out together with the washer 60 and the nut 61, as shown in FIG. 9, to absorb the impact load.

Figure 10:
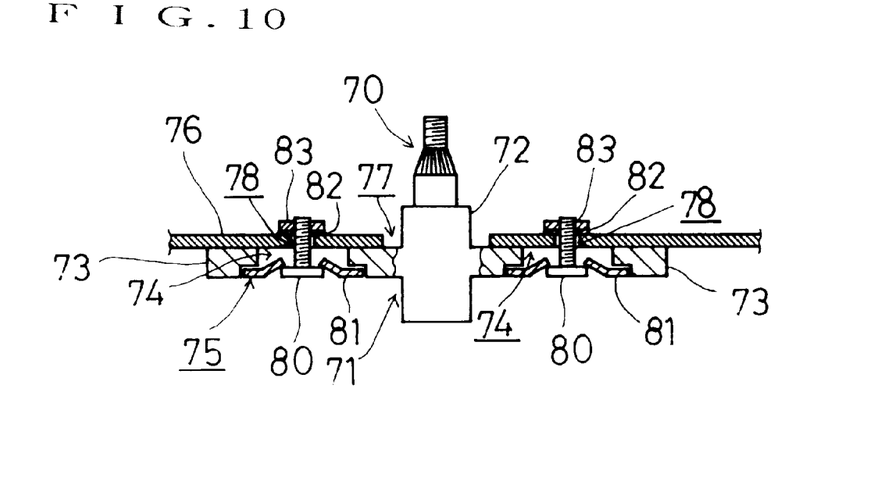
FIG. 10 is a sectional view of an essential part showing a pivot holder attachment construction according to a fourth preferred embodiment of the invention.
Figure 11:
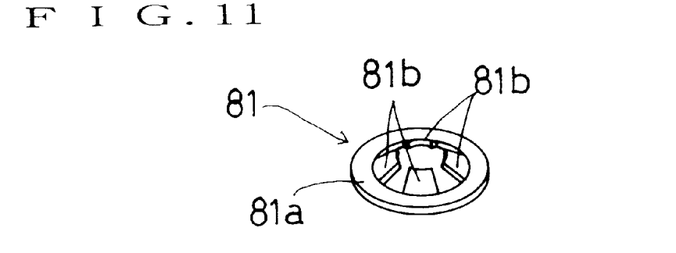
FIG. 11 is a perspective view of a washer thereof.
Figure 12:
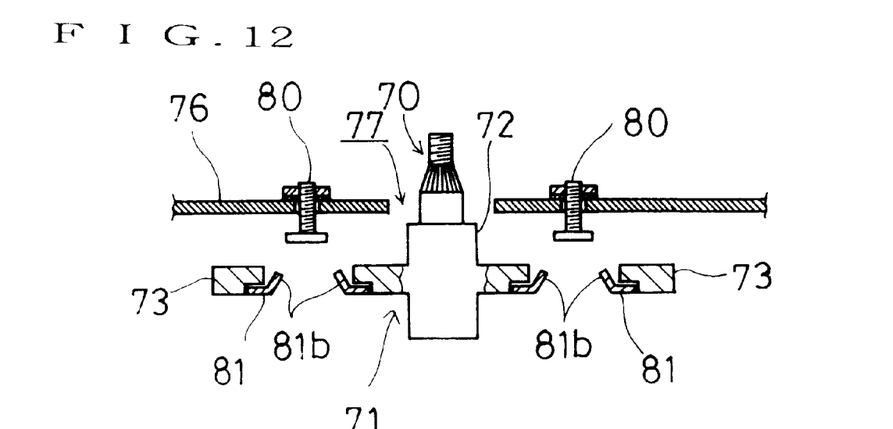
FIG. 12 is a sectional view of an essential part showing a pivot holder after it has dropped out due to an impact load.

FIGS. 10 to 12 show a fourth embodiment of the present invention. A pivot holder 71 pivotally supporting a pivot 70 is composed of a cylindrical bearing section 72 and a flange 73 extruding right and left from the section 72. Respective bolt holes 74 are formed in both end portions of the flange 73. A lower opening of each bolt hole 74 is formed in a shape of a flat circular dent 75 of large diameter.

A car-body panel 76 has a circular opening 77 and bolt holes 78 formed on both sides thereof. The cylindrical bearing section 72 is inserted in the circular opening 77 of the car-body panel 76, the flange 73 is brought into contact with the inner surface of the car-body panel 76, bolts 80 are let pass through bolt holes 74, 78 aligned with each other from inside interposing a washer 81 between a head of the bolt 80 and the flange 73 and nuts 83 are engaged tightly with the bolts exposed outside with a washer 82 interposed between the nut 83 and the panel 76 (FIG. 10).

As shown in FIG. 11, the washer 81 is shaped as a hollow circular plate having a circular ring section 81a and four retaining pieces 81b extruding inside from the ring section 81i a. The washer 81 is fitted in the circular dent 75 of the flange 73 of the pivot holder 71. When the nut 83 is engaged with the bolt 80 penetrating the washer 81 and the bolt holes 74, 78 to tighten the bolt 80, the head of the bolt 80 presses the retaining pieces 81b and the pieces 81b are deformed to some extent as shown in FIG. 10.

When an impact load is applied to the pivot 70 substantially in the axial direction from outside of the vehicle, the load is transmitted to the retaining pieces 81b supported by the head of the bolt 80 through the flange 73 of the pivot holder 71 to deform the retaining pieces 81b more, so that the washer 81 slips off of the head of the bolt 80 and the pivot holder 71 drops out together with the washer 81 to absorb the impact load (FIG. 12).

Repair can be carried out easily by exchanging only the washer 81 and the wiper apparatus can be reused without significant expense.

Figure 13:
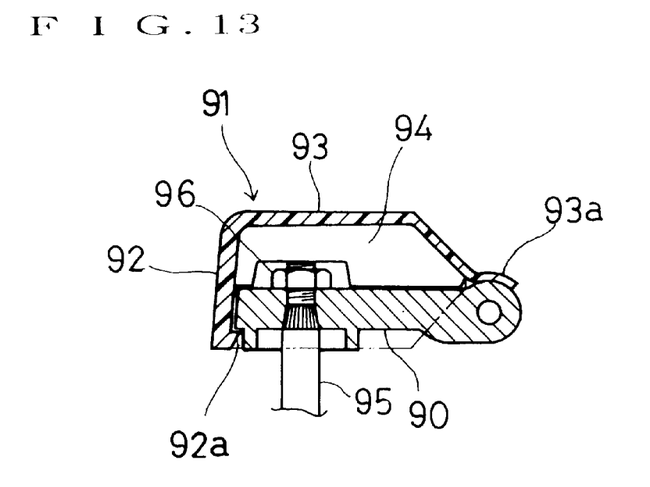
FIG. 13 is a sectional side view of an essential part showing an arm cover attachment construction according to a fifth preferred embodiment of the invention.
Figure 14:
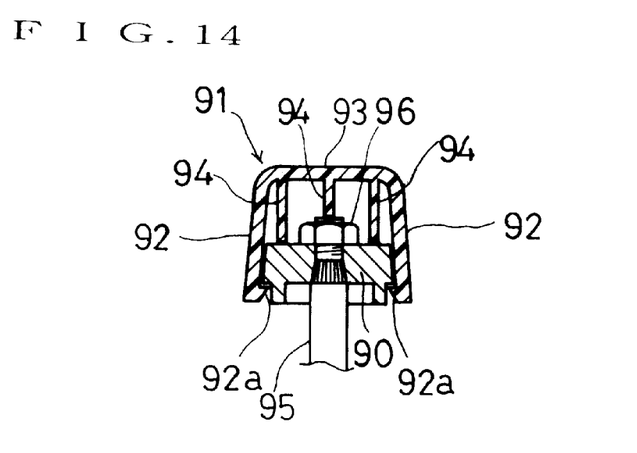
FIG. 14 is a front cross sectional view thereof.
Figure 15:
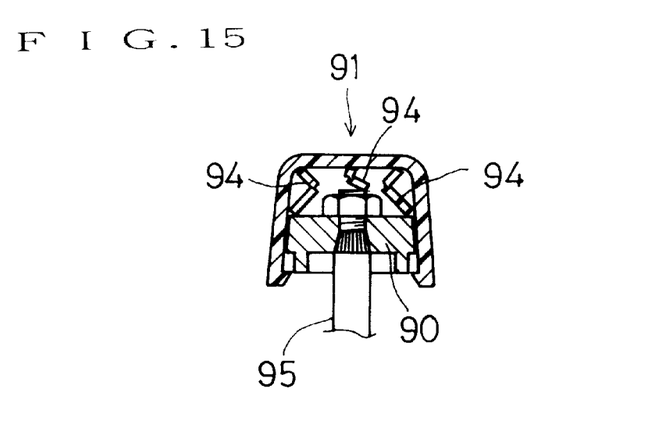
FIG. 15 is a section similar to FIG. 14 when an impact load is applied.

A fourth preferred embodiment of the invention is shown in FIGS. 13 to 15. In this embodiment, a device is applied to an arm cover 91 covering an arm head 90 of a wiper arm.

The arm cover 91 is made of resin and shaped as a long substantially rectangular box having a side wall 92, an upper wall 93 and an opened lower face. At predetermined positions of a lower edge of the side wall 92 are formed retaining claws 92a projecting inside. The upper wall 93 extends lengthwise to form a retaining claw 93a. Within the arm cover 91, three plate-like lengthwise ribs 94 are hung from the upper wall.

The arm cover 91 is put over an arm head 90, which is fixed to a pivot 95 by a nut 96, and retained by the retaining claws 93a, 92a. At that time, lower ends of the ribs 94 come into contact with an upper face of the arm head 90.

When an impact load is applied to the arm cover 91 from outside of the vehicle, the ribs 94 are bent and/or crushed to displace the arm cover 91 as shown in FIG. 15, so that the impact load can be absorbed and damage can be minimized. An impact load capable of bending the ribs can be set by adjusting a thickness of the ribs 94. Repair can be readily and inexpensively carried out by exchanging the arm cover 91.

Figure 16:
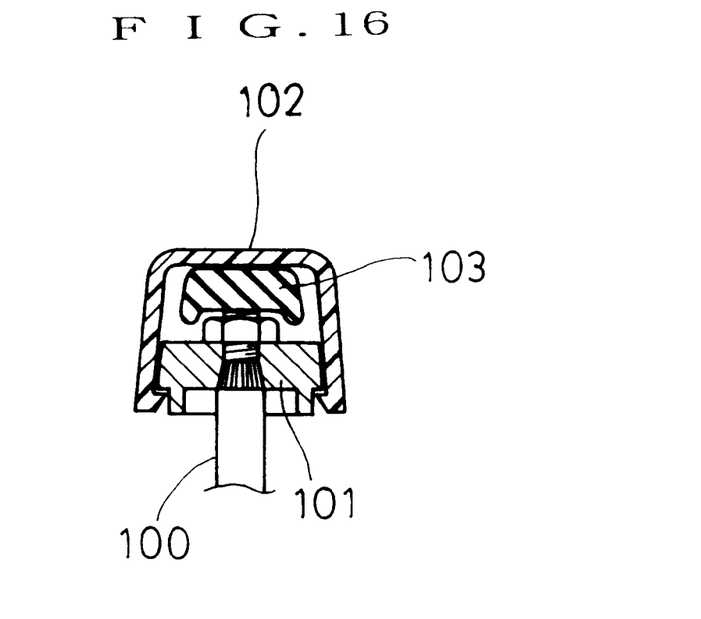
FIG. 16 is a sectional front view of an essential part showing an arm cover attachment construction according to a sixth preferred embodiment of the invention.
Figure 17:
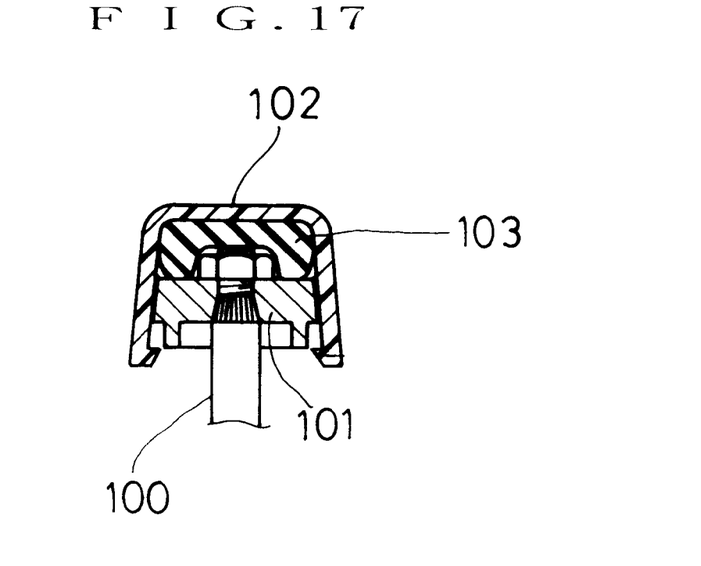
FIG. 17 is a section similar to FIG. 16 when an impact load is applied.

The rib 94 interposed between the arm cover 91 and the arm head 90 may be replaced by a resilient body as shown in FIGS. 16 and 17. In these figures, an arm cover 102 is put over an arm head 101 fitted to a pivot 100 and a resilient body 103 of rubber or other appropriate material is interposed between the arm cover 102 and the arm head 101.

When an impact load is applied to the arm cover 102 from outside of the vehicle, the arm cover 102 is displaced deforming elastically the rubber resilient body 103 to absorb the impact load. When the load is removed, the rubber resilient body 103 and the arm cover 102 are elastically restored to the former state. Exchange of a part is unnecessary for the restoration.

Although there have been described above what are at present considered to be the preferred embodiments of the invention, it will be understood by persons skilled in the art that variations and modifications may be made thereto without departing from the spirit, gist or essence of the invention. The scope of the invention is indicated by the appended claims.

What is claimed is:

1. A wiper apparatus for a vehicle having a rocking wiper arm and a wiper blade attached to a tip end of the wiper arm for wiping a windshield, comprising:

a pivot fixed to a base end of said wiper arm; and a pivot holder attached to a car-body panel, pivotally supporting said pivot and movable inwardly of said car-body panel by a load applied from outside of said vehicle to said wiper apparatus near said pivot, substantially in an axial direction of said pivot;

said pivot holder being attached to said car-body panel through a section having low break strength.

2. A wiper apparatus for a vehicle as claimed in claim 1, wherein said pivot holder has a cylindrical bearing section and a flange formed on said cylindrical bearing section to be fixed to said car-body panel, and said section having low break strength is constituted by a thin portion of said flange formed around said cylindrical bearing section.

3. A wiper apparatus for a vehicle as claimed in claim 1, wherein said pivot holder has a cylindrical bearing section and a cylindrical male screw portion projecting from said cylindrical bearing section through said section having low break strength, and is attached to said car-body panel by a nut engaging with said male screw portion.

4. A wiper apparatus for a vehicle as claimed in claim 1, wherein the section having low break strength includes a part of said car-body panel where said pivot holder is attached which can be deformed by said load in the axial direction.

5. A wiper apparatus for a vehicle as claimed in claim 1, further comprising an attachment member for attaching said pivot holder to said car-body panel, said attachment member including said section having low break strength such that it can be deformed by said load in the axial direction for thereby absorbing the load.

6. A wiper apparatus for a vehicle as claimed in claim 5, wherein said attachment member permits said pivot holder to become detached from the car-body panel when it is deformed by said load.

7. A wiper apparatus for a vehicle having a rocking wiper arm and a wiper blade attached to a tip end of the wiper arm for wiping a windshield, the apparatus comprising:
  a pivot adapted to be fixed to a base end of the wiper arm;
  a pivot holder attached to a car-body panel and pivotally supporting said pivot; and
  means operatively associated with said pivot for absorbing an external impact load applied to the apparatus near said pivot substantially in an axial direction of the pivot, to thereby minimize damage caused to the apparatus by the impact load.

8. A wiper apparatus for a vehicle as claimed in claim 7, wherein said impact load absorbing means comprises a load absorbing member provided outside of a section of said wiper arm where said pivot is fixed, apart in an axial direction of said pivot.

9. A wiper apparatus for a vehicle as claimed in claim 8, wherein said load absorbing member is a cover member covering an end of said pivot with an inner space interposed between said cover member and said pivot, said cover member having an inside rib adapted to be bent or crushed by a load applied substantially in an axial direction of said pivot.

10. A wiper apparatus for a vehicle as claimed in claim 8, wherein said load absorbing member includes a cover member covering an end of said pivot with an inner space interposed between said cover member and said pivot, and a resilient member fitted in said inner space.

11. A wiper apparatus for a vehicle as claimed in claim 7, wherein said impact load absorbing means comprises attachment means for attaching said pivot holder to the cat-body panel such that the pivot holder is movable inwardly of said car-body panel by the external impact load.

12. A wiper apparatus for a vehicle as claimed in claim 11, wherein, said pivot holder is attached to said car-body panel through a section having low break strength.

13. A wiper apparatus for a vehicle as claimed in claim 12, wherein said pivot holder has a cylindrical bearing section and a flange formed n said cylindrical bearing section to be fixed to said car-body panel, and said section having low break strength is constituted by a thin portion of said flange formed around said cylindrical bearing section.

14. A wiper apparatus for a vehicle as claimed in claim 12, wherein said pivot holder has a cylindrical bearing section and a cylindrical male screw portion projecting from said cylindrical bearing section through said section having low break strength, and is attached to said car-body panel by a nut engaging with said male screw portion.

15. A wiper apparatus for a vehicle as claimed in claim 11, wherein the apparatus includes a part of said car-body panel where said pivot holder is attached, said part of said car-body panel having low deformation strength so that it can be deformed by said load in the axial direction.

16. A wiper apparatus for a vehicle as claimed in claim 11, further comprising an attachment member for attaching said pivot holder to said car-body panel, said attachment member having low strength such that it can be deformed by said load in the axial direction for thereby absorbing the load.

17. A wiper apparatus for a vehicle as claimed in claim 11, wherein said attachment means attaches said pivot holder to the car-body panel such that the pivot holder is separable from the car-body panel and movable inwardly of the car-body panel by the external impact load.

* * * * *

UNITED STATES PATENT AND TRADEMARK OFFICE
CERTIFICATE OF CORRECTION

PATENT NO. : 6,505,376 B1
DATED : January 14, 2003
INVENTOR(S) : Mamoru Kagawa

It is certified that error appears in the above-identified patent and that said Letters Patent is hereby corrected as shown below:

Column 1,
Line 36, change "toward inside" to -- inwardly --.
Line 49, change "body absorb" to -- body to absorb --.

Column 2,
Line 25, change "fixed apart" to -- fixed, apart --.
Line 28, before the comma insert -- of the pivot --.
Line 60, after "invention" change the period to a semi-colon.

Column 3,
Line 36, change "apparatus 10" to -- apparatuses 10 --.
Line 62, change "there with" to -- therewith --.

Column 4,
Line 17, change "is rocks" to -- rocks --.
Line 47, after "and" delete the period.

Column 5,
Lines 8-9, change "on the both side thereof" to -- on opposite sides thereof --.
Line 15, change "bolt 59 are is" to -- bolts 59 are --.
Line 51, change "81$i$ $a$" to -- 81$a$ --.

Column 6,
Line 1, change "fourth" to -- fifth --.

UNITED STATES PATENT AND TRADEMARK OFFICE
CERTIFICATE OF CORRECTION

PATENT NO.    : 6,505,376 B1
DATED         : January 14, 2003
INVENTOR(S)   : Mamoru Kagawa It is certified that error appears in the above-identified patent and that said Letters Patent is hereby corrected as shown below:

<u>Column 8,</u>
Line 6, change "cat-body" to -- car-body --.
Line 14, change "formed n said" to -- formed on said --.

Signed and Sealed this

Twenty-fourth Day of June, 2003

JAMES E. ROGAN
*Director of the United States Patent and Trademark Office*